United States Patent [19]

Findeisen

[11] 4,196,375
[45] Apr. 1, 1980

[54] A.C. TAPE REEL SERVO

[75] Inventor: Heinz H. Findeisen, Milford, Mass.

[73] Assignee: Digital Equipment Corporation, Maynard, Mass.

[21] Appl. No.: 892,236

[22] Filed: Mar. 31, 1978

[51] Int. Cl.² ............................................. B65H 77/00
[52] U.S. Cl. ........................................ 318/6; 318/809; 318/752; 318/257; 318/297
[58] Field of Search ................... 318/6, 257, 268, 297, 318/351, 436, 809, 806, 812, 749, 752, 754, 54

[56] References Cited

U.S. PATENT DOCUMENTS

| | | | |
|---|---|---|---|
| 3,800,196 | 3/1974 | Zimmerman | 318/6 |
| 3,829,748 | 8/1974 | Davenport | 318/257 |
| 4,072,883 | 2/1978 | Beiter | 318/257 |
| 4,078,393 | 3/1978 | Wills | 318/809 |

FOREIGN PATENT DOCUMENTS 1022199  5/1964  United Kingdom ..................... 318/6

Primary Examiner—J. V. Truhe
Assistant Examiner—John W. Repman
Attorney, Agent, or Firm—Albert P. Cefalo; Thomas C. Siekman; Arthur W. Fisher

[57] ABSTRACT

A linear servo circuit for A.C. motors is disclosed. The servo circuitry is used in a magnetic tape transport to control the motor which operates a tape reel on which the magnetic tape is stored. The servo circuitry develops two complimentary saw-tooth voltage waveforms synchronized to the sinusoidal A.C. line voltage. One saw-tooth waveform is used to control the motor in the forward direction and the other saw-tooth waveform is used to control the motor in the reverse direction. Comparator circuitry compares the saw-tooth waveforms to a D.C. control voltage which is proportional to the angular position of an arm that controls the tension of the magnetic tape. The comparator circuitry provides a control pulse to a photodiode when the saw-tooth waveform exceeds the D.C. control voltage. Light pulses from the photodiode impinge on a light sensitive SCR which in turn triggers a triac to apply power in the forward or reverse direction to the A.C. tape reel motor.

10 Claims, 3 Drawing Figures

A.C. TAPE REEL SERVO

BACKGROUND OF THE INVENTION

1. Field of the Invention

This invention is related to magnetic tape data recording apparatus and more particularly to the circuitry for controlling the tape reel motors of a magnetic tape transport.

2. Description of the Prior Art

Many magnetic data recording systems utilize a tape with a coating of magnetic material which is selectively magnetized to record digital information. The tape itself consists of a long strip of flexible material, typically mylar plastic on which the magnetic coating is applied and it is wound on two reels for physical storage. During operation of the storage system, the tape is unwound from one reel, processed and then wound onto the other reel. Processing of the tape is accomplished by moving it past magnetic transducers and associated electronic circuitry which either writes information onto or reads information off of the tape. In order to insure proper reading or writing of digital information the tape must be moved past the transducers at a constant speed. If the tape were unwound off the tape reel directly past the magnetic transducers, the tape speed would vary as the amount of tape left on the reel changed and would also vary due to variations in the tape reel rotation caused by imprecise control. In order to insure uniform tape speed, tape drives usually utilize a separate tape control mechanism. Accordingly, before the tape passes over the magnetic transducers it may be run over a capstan or through pinch-roller mechanism which is driven by a separate precision electric motor rotating at a constant speed. The capstan or pinch-roller mechanism requires a constant tension on the tape to operate properly. In addition, there must be some means of compensating for differences between the velocity of the tape running over the capstan and the velocity of the tape reel. Therefore, the tape is usually formed into a loop between the tape reel and the capstan. Slight variations in the tape speed coming off the tape reel and the tape speed passing over the capstan mechanism are compensated by changes in the loop length. In order to provide proper tension on the tape loop, several mechanisms are used. In one mechanism, the tape loop is formed in a channel or column and vacuum is applied to one side of the tape. In another mechanism, the tape loop is formed by an idler roller rotating on a spring loaded arm that applies tension to the loop. The tape loop is typically kept at constant length by adjusting the rotational speed of the tape reel. This adjustment is carried out by servo circuitry which senses the position of the tape loop and controls the tape reel drive motor.

Many prior art systems utilize a D.C. servo loop and a D.C. motor to control the tape reel rotation. A conventional D.C. feedback servo circuit then can be used to control the D.C. tape reel motor. Such a circuit, however, has several drawbacks. In order to record information at a high density, the magnetic tape must be moved at a high velocity past the recording transducers necessitating a high rotational speed of the tape reel. The high speeds involved require the D.C. motors which control the tape reel to be large and powerful in turn requiring high currents to drive the motors. In order to control these high currents, the D.C. motor control and servo circuitry must include large and powerful D.C. amplifiers and associated power supplies to develop the required D.C. currents. These large power amplifiers and power supplies require many circuit components and generate a large amount of heat which must be removed from the circuitry by cooling fans. In addition, D.C. motors generally have brushes and commutators which cause severe wear problems and limit the useful life of the motor.

SUMMARY OF THE INVENTION

The foregoing and other problems are solved in one illustrative embodiment of the invention in which an A.C. tape reel motor is used in a magnetic tape drive and the motor is accurately controlled by a linear A.C. servo circuit. The servo circuitry consists of timing circuitry which produces a saw-tooth waveform synchronized to the A.C. line. This waveform is compared by comparator circuitry to a D.C. voltage derived from a transducer connected to the spring arm which applies tension to the tape. The output of the comparative circuitry is used to drive a photodiode which is optically coupled to a light sensitive SCR. The SCR upon firing triggers a triac which applies A.C. power to a winding of the A.C. tape reel motor. The motor may be run in the reverse direction by similar circuitry which applies A.C. power to another motor winding.

In one illustrative embodiment, a square wave is generated which is synchronized to the A.C. line frequency by comparing the A.C. line voltage to a D.C. reference voltage. The comparator circuitry generates pulse outputs at predetermined levels of the A.C. sine wave. The pulse outputs of the comparator are then used to trigger and reset an R.C. integrator circuit which produces an approximately linear ramp waveform synchronized to the A.C. line. The voltage of the ramp waveform is compared in another comparator to a control voltage developed by a transducer connected to the tape loop spring tension arm. When the ramp voltage is above the control voltage, the comparator produces an output which energizes a photodiode. The photodiode in turn energizes an optically-coupled SCR which triggers a triac applying A.C. power to the tape reel motor. The motor may be controlled to rotate in either a forward or reverse direction by applying power to forward or reverse windings. Duplicate circuitry is used to control each winding. In this manner a closed loop A.C. servo is utilized to accurately and proportionally control the tape reel motor speed to keep the length of the tape loop constant. Since an A.C. induction motor is used there are no brushes or commutators to wear and the useful life of the motor is thereby extended.

DETAILED DESCRIPTION

Figure 1:
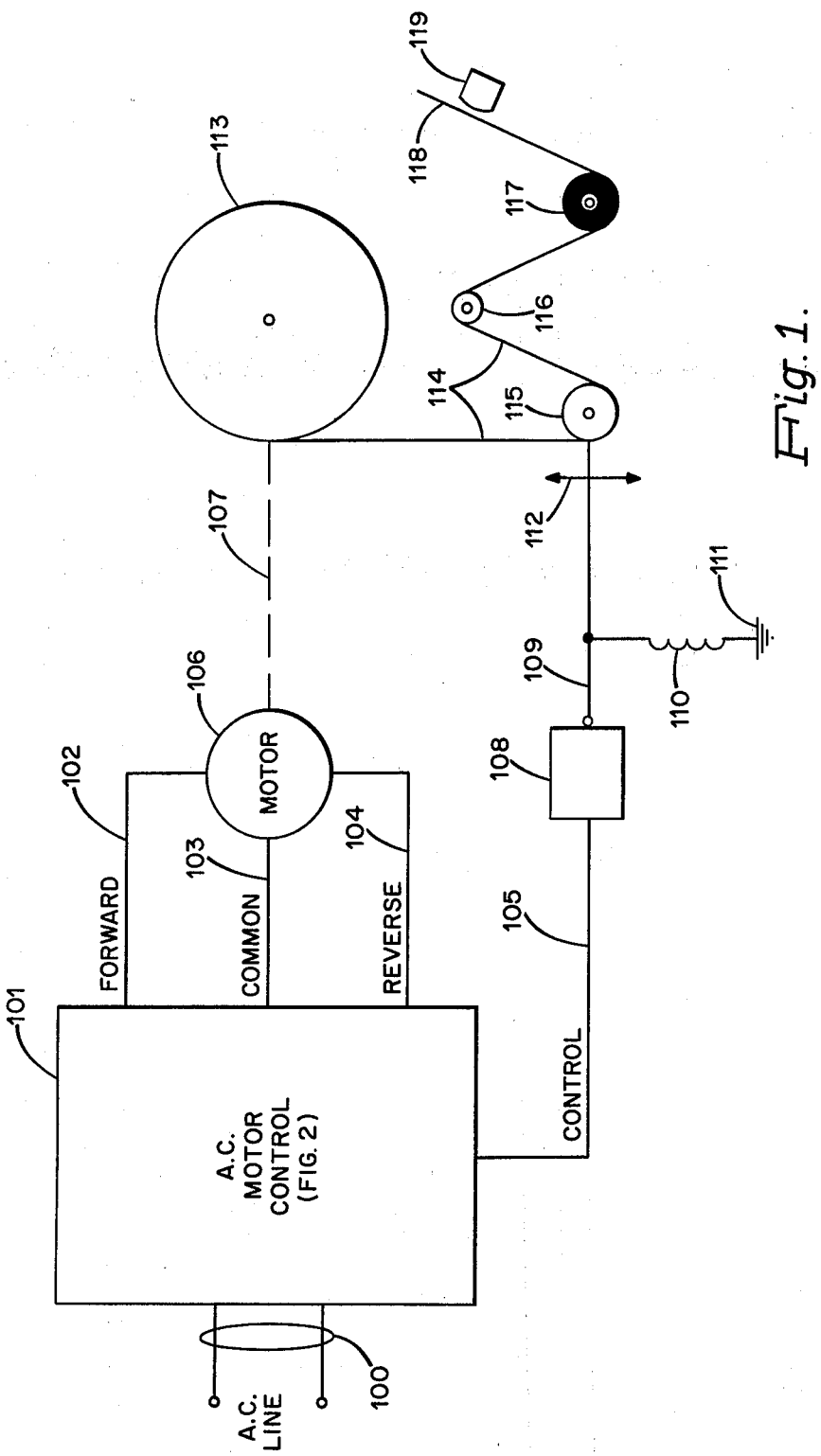
FIG. 1 shows a schematic diagram of a magnetic tape transport utilizing the A.C. motor control of the present invention.

A schematic diagram of a portion of a tape transport system for a magnetic tape drive is shown in FIG. 1. In this system flexible tape 118 having a magnetic coating is moved past magnetic transducers 119 which write information on or read information off of tape 118. The reading and writing electronic circuitry which controls magnetic transducers 19 is not concerned with this invention and accordingly has not been shown.

To insure proper processing of tape 118 by transducers 119, tape 118 passes over capstan 117 which rotates at a constant rate of speed. Capstan 117 is driven at a constant angular velocity by a precision electric motor (not shown) which is of conventional design and operation. After passing over capstan 117, tape 118 passes over idler roller 116, tape loop roller 115 and is thereupon wound on and stored on tape reel 113. In passing over roller 115, tape 118 forms a loop 114 which compensates for differences in the rotational speeds between reel 113 and capstan 117.

In order to keep loop 114 under tension, roller 115 is mounted on the end of arm 109. Arm 109 is in turn pivoted at its left end at transducer apparatus 108. Arm 109 is pulled downward, applying tension to loop 114, by means of spring 110 which is attached at its lower end to the frame of the tape transport, a portion of which is shown at 111. Arm 109 moves in the direction of arrow 112 to compensate for changes in the length of loop 114; for example, if tape 118 is being wound onto reel 113 faster then it is passing over capstan 117, loop 14 becomes shorter and roller 115 moves upwards. If on the other hand, tape is being wound onto reel 113 slower then it is passing over capstan 117, loop 114 becomes longer and roller 115 moves downward.

Advantageously, loop 114 is kept at constant length by means of a servo circuit including transducer circuitry 108, A.C. motor control 101 and A.C. motor 106. A.C. motor 106 is a single phase A.C. motor of well-known design having split windings. If full A.C. line voltage is applied across the forward windings via leads 102 and 103, motor 106 rotates at a constant speed in the clockwise direction and drives tape reel 113 also in the clockwise direction by means of shaft 107. If, on the other hand, full A.C. line voltage is applied across leads 103 and 104, motor 106 rotates in the counterclockwise direction, driving tape reel 113 in the counterclockwise direction by means of shaft 107.

In accordance with the present invention, the power applied to motor 106 is controlled by motor control circuit 101. Motor control circuit 101 receives full A.C. line power at input 100 and applies power to motor 106 under control of signals developed by transducer 108. Specifically, transducer circuitry 108 develops a D.C. voltage at its output 105 which is proportional to the angular displacement of arm 109. Circuitry 108 consists of an electro-mechanical transducer which converts the angular motion of arm 109 into an electrical signal. This transducer may be of any conventional design, such as a differential linear voltage transformer (which is commonly used in electrical scales), a potentiometer or any other similar device which proportionally converts angular position into an electrical voltage. Transducer circuitry 108 also contains filters and amplifier circuitry which process the signal to remove noise. Circuitry 108 is arranged such that when arm 109 is in approximately the position shown in FIG. 2 the voltage developed at lead 105 is approximately zero volts. If arm 109 moves upwards then the voltage developed on output lead 105 by circuitry 108 is negative. On the other hand if arm 109 moves in the downward direction, circuitry 108 develops a positive voltage proportional to the movement on lead 105.

As will be described in detail hereinafter, the control signal on lead 105 is supplied to motor control circuit 101 which thereupon applies power from A.C. line 100 to either the forward lead 102 or the reverse lead 104 of motor 106. Advantageously, in accordance with the invention, the full sinusoidal A.C. waveform present on line 100 is not always applied by motor control 101 to motor 106, rather only portions or pulses of the full A.C. wave form are applied to motor 106. Since the output speed developed by motor 106 is proportional to the average power applied to either its forward or reverse leads, motor control 101 can thereby proportionately control the speed and output power of motor 106 in response to signals on lead 105.

Figure 2:
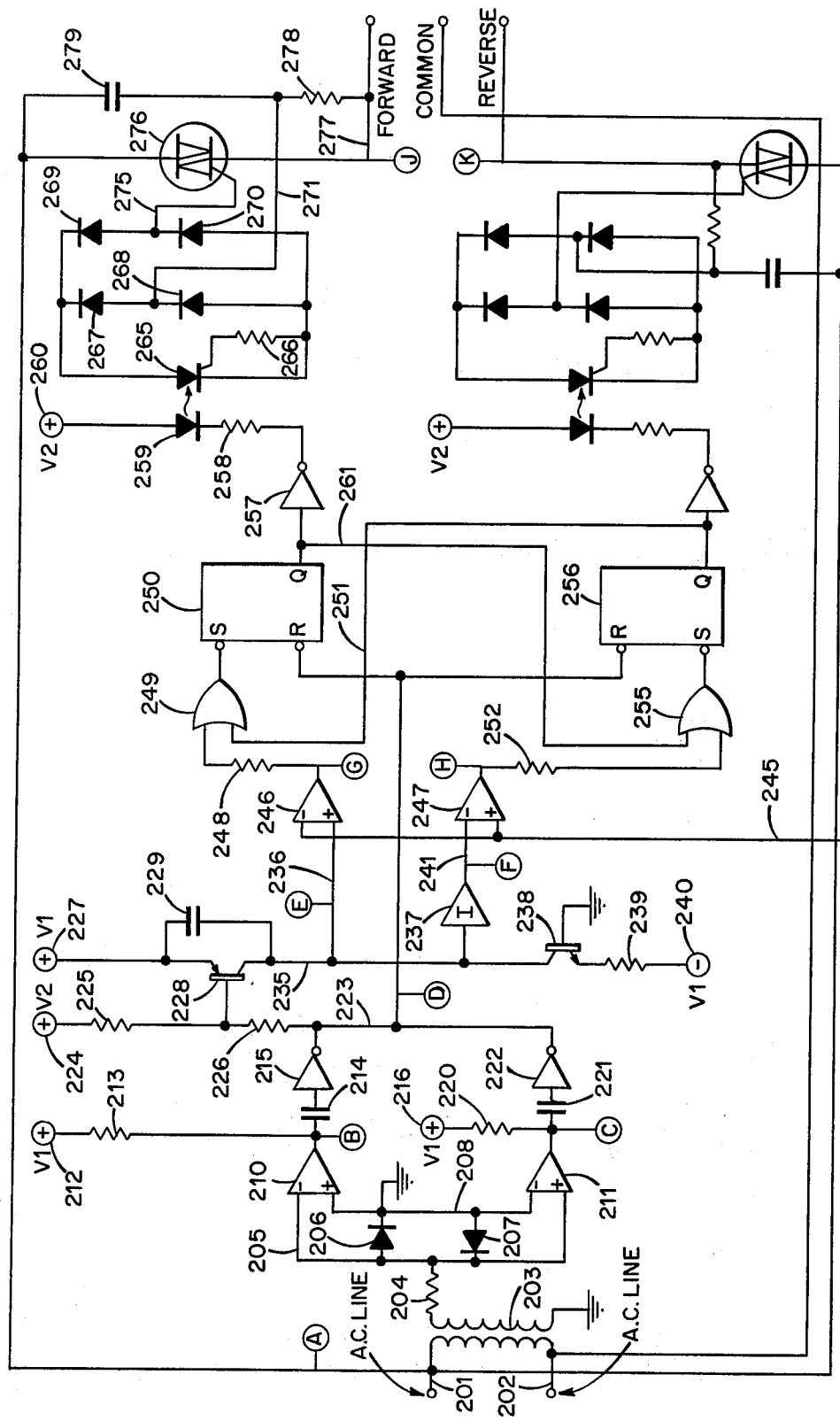
FIG. 2 the drawing shows an electrical schematic of the A.C. servo control circuitry.
Figure 3:
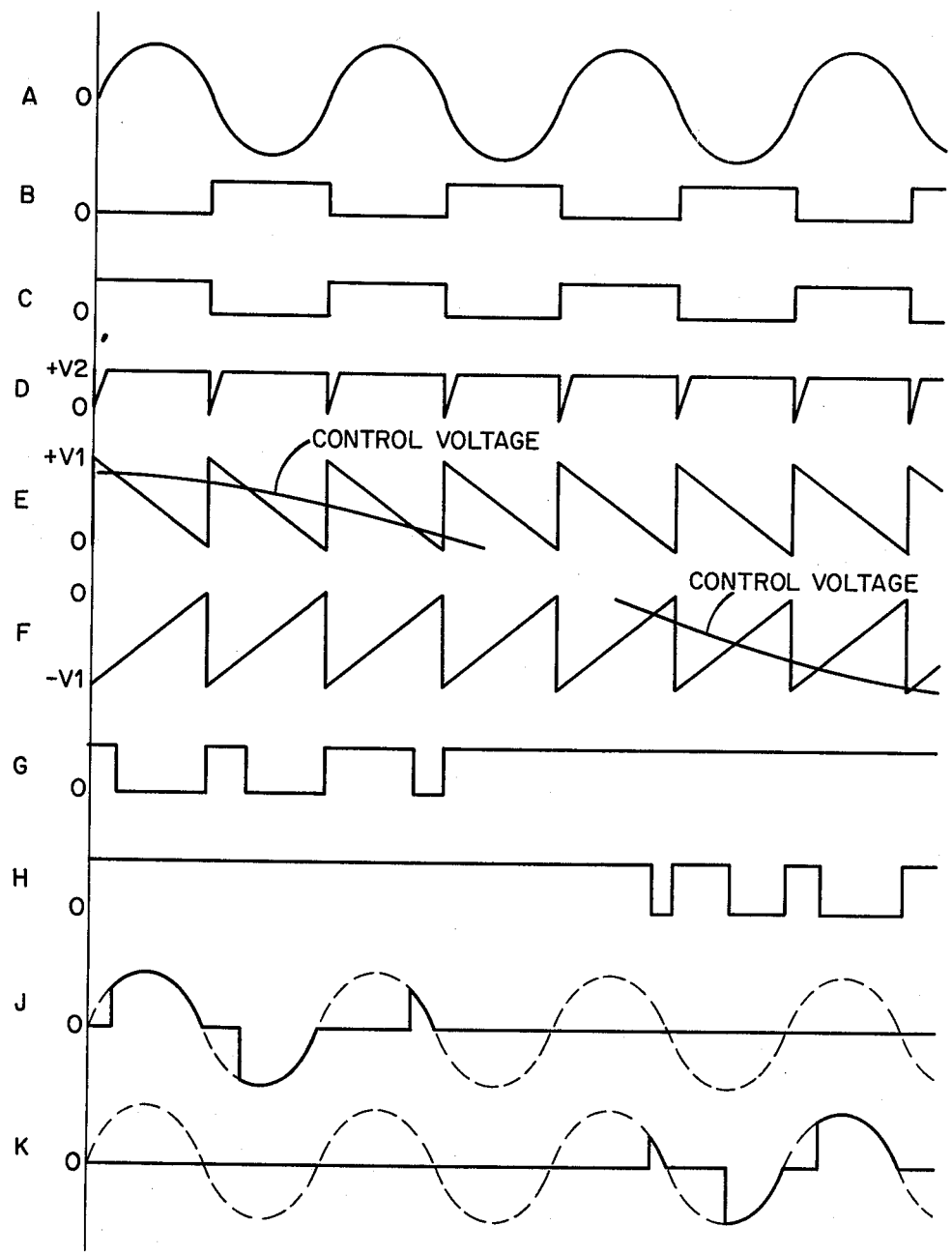
FIG. 3 of the drawing shows various electrical waveforms at different points in the circuitry of FIG. 2.

Referring now to FIGS. 2 and 3, the detailed circuitry of A.C. motor control 101 will be described. FIG. 2 shows electrical schematic of the motor control and FIG. 3 shows electrical voltage waveforms at the points denoted by circled letters in the circuitry shown in FIG. 2. A.C. power is provided to the circuit at the left hand side of FIG. 2 across terminals 201 and 202. Using point 202 as a reference, the A.C. waveform at input 201 is shown as waveform A in FIG. 3 and is the normal sinusoidal A.C. waveform. The A.C. waveform at input 201 is applied to the primary coil of isolation transformer 203. Transformer 203 serves to isolate the trigger circuitry of the A.C. motor control from the A.C. line and to reduce the line voltage to a voltage suitable for operation of the trigger circuitry. It may illustratively have a ten to one turn ratio. The secondary coil of transformer 203 has one end connected to circuit ground and the other end connected via resister 203 and lead 205 to the negative input of comparator 210 and the positive input of comparator 211.

Comparators 210 and 211 together with transistors 228 and 238 and associated circuitry develop a saw-tooth waveform which is synchronized to the sinusoidal A.C. line frequency. This saw-tooth waveform is then compared as will be hereinafter described to an incoming D.C. control voltage and used to trigger the triac controls which operate the tape reel motor. Specifically, signal ground is applied to the positive input of comparator 210 and the negative input of comparator 211 via lead 208. Comparators 210 and 211 are well-known circuit devices which produce a low signal at their output when the magnitude of the signal present at their negative input exceeds the magnitude of the signal present at their positive input. Thus, comparator 210 produces a low (zero) voltage output when the A.C. voltage waveform present on lead 205 exceeds ground present on lead 208. Typically, comparator 210 has a low threshold voltage so that the voltage on lead 205 must exceed ground by only a small amount before comparator 210 responds by producing a low output. In a similar fashion, comparator 211 produces a low output when the magnitude of the A.C. waveform present on lead 205 decreases below ground by its threshold amount. Diodes 206 and 207 clamp the signal present on lead 205 to prevent damage to comparators 210 and 211 caused by over-voltage on lead 205.

The outputs developed by comparators 210 and 211 are therefore, square wave outputs which have transitions close to the zero crossings of the A.C. waveform. These outputs are shown in lines B and C of FIG. 3, respectively.

The square wave output of comparator 210 is fed into a differentiator circuit consisting of resistor 213, capacitor 214 and buffer amplifier 215. In the differentiator circuit, the output of comparator 210 is biased to a positive voltage via resistor 213 and voltage source 212 (which may illustratively be about five volts). Capacitor 214 differentiates the square wave output of comparator 211, producing pulses at the transition points of the square wave. A positive pulse is produced corresponding to a low to high transition of the square wave and a negative pulse is produced corresponding to a high to low transition of the square wave. The output of comparator 211 is similarily differentiated by circuitry consisting of voltage source 216, resistor 220, capacitor 221 and amplifier 222.

Amplifiers 215 and 222 are "open collector" amplifiers and are connected together in a "wired OR" configuration. In this configuration the outputs of amplifiers 215 and 222 are held high via lead 223, resistors 225, 226, and voltage source 224 (which illustratively may be about 15 volts). Lead 223 may be pulled to a low state in response to a low signal at the outputs of either amplifier 215 or amplifier 222. Since amplifiers 215 and 222 are inverting amplifiers, a low signal will appear on lead 223 when a positive pulse is applied to the inputs of either amplifier 215 or 222. Thus, a low pulse will be produced on lead 223 corresponding to each low to high transition produced by comparator 210 or comparator 211. The resulting waveform is shown as line D in FIG. 3. As shown in the figure, a pulse is produced approximately at each zero-crossing of the A.C. line waveform.

The pulses on lead 223 are applied via resistor 226 to transistor 228. Transistor 228 in conjunction with transistor 238 and capacitor 229 form a ramp or saw-tooth generator circuit which generates a timebase waveform for later comparison to a control voltage. The ramp waveform in synchronized to the sinusoidal A.C. line voltage by means of the pulses produced on the 223. Specifically, transistor 238, resistor 239, and voltage source 240 form a constant current source which draws a fixed current through lead 235. Transistor 238 is normally biased into its conducting state by voltage source 240 and resistor 239. Since the base of transistor 238 is grounded, the emitter lead of transistor 238 is held at a voltage slightly below ground level by transistor action. Thus, a fixed voltage is present across resistor 239 and, therefore, a constant current passes through resistor 239. The constant current drawn through lead 235 charges capacitor 229 from voltage source 227 at a constant rate. If not reset, the voltage across capacitor 229 would eventually increase to the full difference between voltage source 227 and voltage source 240. However, transistor 228 is connected across capacitor 229. Transistor 228 is normally biased in its non-conducting state by resistor 225 and voltage source 224. However, the negative going pulses on lead 223 produce as previously described by comparators 210 and 211 are sufficient to turn on transistor 228 via resistor 226. In its onstate, transistor 228 discharges capacitor 229 completely. The voltage across capacitor 229 is, therefore, reset each time a negative going pulse appears on lead 223. With proper adjustment of the charging time constants determined by the value of capacitor 229 and resistor 239 the ramp portion of the waveform is approximately linear, and thus, the voltage on lead 235 is a saw-tooth waveform synchronized to the sinusoidal A.C. line voltage as shown in line E of FIG. 3. This saw-tooth waveform is inverted by inverting amplifier 239 which may be any conventional wellknown circuitry such as an operational amplifier connected in feedback configuration with a gain of one. The signal at the output of the inverting amplifier shown in line F of FIG. 3 is therefore the inverse of the signal shown in line E of FIG. 3.

These ramp shaped timebase waveforms are thereupon compared to a D.C. control signal to develop trigger pulses which will be used to control the triac motor control circuitry. Specifically, the signals E and F in FIG. 3 are provided via leads 236 and 241 to the positive and negative inputs respectively of comparators 246 and 247. The negative input of comparator 246 and the positive input of comparator 247 receive a D.C. control voltage which is developed by the transducer circuitry 108 shown in FIG. 1. As previously explained, this control voltage is proportional to the angular position of arm 109. A positive signal present on the control voltage input indicates tape loop 114 is too long and that reel 113 should be advanced in the clockwise direction to shorten the loop 114. On the other hand a negative value of the control voltage indicates that loop 114 is too short and that reel 113 should be advanced in the counterclockwise direction to lengthen loop 114. As will be hereinafter explained, motor control circuit 101 applies power to motor 106 so that tape loop 114 remains at constant length. Therefore, normally even if tape 118 is not moving, motor control 101 applies sufficient power to the forward windings of motor 106 via lead 102 to balance the tension of spring 110 on arm 109. Proper tape loop length is thereby maintained at all times.

Similar to comparator circuits explained previously, comparator 246 produces a low signal at its output when the control voltage on lead 245 applied to its negative input exceeds the magnitude of the ramp waveform applied to its positive input via lead 236. Similarly, comparator 247 produces a low signal at its output when the magnitude of the inverted ramp waveform applied to its negative input via lead 241 exceeds the magnitude of the control voltage applied to its positive input via lead 245. In FIG. 3 an illustrative value of the control voltage present on lead 245 is superimposed on the ramp waveform in lines E and F resulting in the outputs from comparators 246 and 247 as shown in lines G and H.

The outputs of comparators 246 and 247 are applied to the latch circuit consisting of OR gates 249 and 255 and flip-flops 250 and 256 in order, as will be described, to trigger the triac motor control circuitry. This latch circuit prevents spurious pulses from triggering the triac control circuitry when the servo circuitry shifts from the forward direction to the reverse direction. Specifically, when a positive control voltage is present on lead 245, an output is produced by comparator 246 which output is applied to the upper input of OR gate 249 via resistor 248. Assuming that a low signal is present on lead 251 and at the lower input of OR gate 249 it produces a low signal to set flip-flop 250. Set flip-flop 250 applies a high signal to its Q output which high signal is inverted by inverter 257 and applied as a low signal to resistor 258. The low signal at resistor 258 causes current to flow from voltage source 260 through photodiode 259 and resistor 258. Current flowing through photodiode 259 produces a light output which impinges on the motor control circuitry causing it (as will be later described) to apply forward power to the motor. In addition, the high signal at the Q output flip-flop 250 is applied via lead 261 to OR gate 265, disabling it, and preventing flip-flop 256 from inadvertently being set. Flip-flop 250 is subsequently reset by negative going pulses appearing on lead 223 applied to its reset input.

In the case where the control voltage on lead 245 is negative, an output is produced by comparator 247, which output is applied to the latch circuitry by means of resistor 252 and results in reverse power being applied to the motor circuitry.

The triac motor control circuitry consists of light sensitive SCR 265, diodes 267 through 270 and triac 276.

The motor control circuitry operates when light pulses produced by photo diode 259 impinge on light sensitive SCR 265. SCR 265 has its gate lead connected to its cathode by resistor 266 and thus, light pulses impinging on it cause it to trigger into its conducting state. When SCR 265 is conducting, a bidirectional current path is established between leads 275 and 271 via the diode bridge consisting of diodes 267 through 270. Current may, therefore, flow in the gate circuit of triac 276 via leads 275, diodes 267 through 270 conducting SCR 265, lead 261, and resistor 278. The current flowing in the gate circuit of triac 276 triggers the triac into its conducting state and power is thereby applied via lead 227 to the forward winding of tape reel motor 106 (FIG. 1). Capacitor 279 prevents voltage spikes appearing on the A.C. line from triggering triac 276. The power applied to the forward windings of the tape reel motor is shown in line J in FIG. 3. As shown in line J power is applied via triac 276 to motor 106 each time the output of comparator 246 is low.

Similarly, power may be provided to the reverse windings of the tape reel motor each time the output of comparator 247 becomes low via circuitry shown in FIG. 2 which operates in a manner exactly similar to that previously described for the forward direction. The power applied to the reverse windings of the tape reel motor is shown in line K in FIG. 3.

What is claimed is:

1. A servo circuit for a magnetic tape drive, having a tape reel on which magnetic tape for said drive is wound, an A.C. motor for rotating said tape reel, means for forming a loop in said tape, transducer means for developing a control signal proportional to the length of said loop, and means for receiving power from an A.C. power line having a sinusoidal voltage waveform thereon; said servo circuitry comprising, means for generating a saw-tooth voltage waveform synchronized to the frequency of said power line and having a frequency which is a multiple of the frequency of said power line, comparing means, having an output, and being responsive to said control signal and said voltage waveform for applying a gate signal to said output when the magnitude of said voltage waveform equals the magnitude of said control signal and for removing said gate signal from said output the next subsequent time when the magnitude of said voltage waveform equals the magnitude of said control signal, and means responsive to said gate signal appearing at said comparing means output for applying power from said power line to said motor.

2. A servo circuit according to claim 1 wherein said generating means comprises, detector means responsive to said A.C. power line for producing a pulse each time the magnitude of said voltage waveform of said A.C. power line substantially equals zero, integrator means for producing a linearly increasing voltage output, and means responsive to each said pulse for resetting said integrator means to a zero output.

3. A servo circuit according to claim 2 wherein said power applying means comprises means responsive to said gate signal appearing at said comparing means output for generating a light pulse means for selectively connecting said power line to said motor, and means responsive to said light pulse for controlling said connecting means to connect said motor to said power line.

4. In a magnetic tape drive having a tape reel on which magnetic tape for said drive is wound, an A.C. motor for rotating said tape reel, said motor having a forward winding and a reverse winding, means for forming a loop in said tape, transducer means for developing a control signal proportional to the length of said loop, and means for receiving power from an A.C. power line having a sinusoidal voltage waveform thereon, a servo circuitry for selectively applying power from said power line to said motor, said servo circuitry comprising means for generating a saw-tooth voltage waveform synchronized to the frequency of said power line and having a frequency which is a multiple of the frequency of said power line, first comparator means responsive to said control signal and said saw-tooth voltage waveform for producing a first output signal when the magnitude of said control signal exceeds the magnitude of said saw-tooth voltage waveform, means responsive said saw-tooth voltage waveform for producing an inverted saw-tooth voltage waveform, second comparator means responsive to said control signal and said inverted saw-tooth voltage waveform for producing a second output signal when the magnitude of said inverted saw-tooth voltage waveform exceeds the magnitude of said control voltage, first means responsive to said first output signal for applying power from said power line to said forward winding of said motor to cause said motor to operate in a forward direction, and second means responsive to said second output signal for applying power from said power line to said reverse winding of said motor to cause said motor to operate in a reverse direction.

5. In a magnetic tape drive, a servo circuit according to claim 4 wherein said generating means comprises, detector means responsive to said A.C. power line for producing a pulse each time the magnitude of said voltage waveform of said A.C. power line substantially equals zero, a capacitor, a constant current source for charging said capacitor at a constant rate to produce a linearly increasing voltage across said capacitor, and means responsive to each said pulse for shorting said capacitor to reduce the voltage thereacross to zero.

6. In a magnetic tape drive, a servo circuit according to claim 4 wherein said first power applying comprises, a bi-stable device, having two states, said bi-stable device producing an output when in one of said two states and said bi-stable device producing no output when in the other of said two states, a light source responsive to said output of said bi-stable device for producing a light output, means responsive to said first output of said first comparator for placing said bi-stable device in said one of said two states, and power control means responsive to said light output for connecting said A.C. power line to said forward winding of said motor.

7. In a magnetic tape drive, a servo circuit according to claim 6 wherein said power control means comprises, a triac for selectively connecting said A.C. power line to said forward winding of said motor, said triac having a gate lead for receiving trigger signals, said trigger signals causing said triac to connect said power line to said motor, a diode bridge circuit connected to said triac gate lead for rectifying signals thereon, and a light sensitive SCR connected across said diode bridge and responsive to said light output for placing a low impedance across said diode bridge.

8. In a magnetic tape drive having a tape reel on which magnetic tape for said drive is wound, an A.C. motor for rotating said tape reel, said motor having a forward winding and a reverse winding, an idler roller for forming a tape buffer loop in said tape, a spring arm connected to said idler roller for applying a predetermined tension to said tape, transducer means for developing a control signal proportional to the angular displacement of said spring arm, and means for receiving power from an A.C. power line having a sinusoidal voltage waveform thereon; a servo circuit for selectively applying power from said A.C. power line to said motor, said servo circuit comprising, a first comparator, having a positive and a negative input and an output, said first comparator negative input being connected to said power line and said first comparator positive input being connected to circuit ground, a second comparator, having a positive and a negative input and an output, said second comparator positive input being connected to said power line and said second comparator negative input being connected to circuit ground, first means for differentiating signals appearing at said output of said first comparator, second means for differentiating signals appearing at said output of said second comparator, means for logically ORing the outputs of said first differentiating means and said second differentiating means to produce a pulse train having a pulse substantially simultaneously in time with each zero crossing of said sinusoidal voltage waveform on said A.C. power line, a capacitor, a constant current source for charging said capacitor at a constant rate, a transistor connected across a capacitor, said transistor being responsive to said pulse train produced by said ORing means for repetitively shorting said capacitor, a third comparator, having a positive and a negative input and an output, said third comparator positive input being connected to said capacitor to receive the voltage thereacross and said third comparator negative input being connected said transducer means to receive said control signal, means responsive to the voltage appearing across said capacitor for inverting said voltage appearing across said capacitor said means having an output whereon said inverted voltage signal appears, a fourth comparator, having a positive and a negative input and an output, said fourth comparator negative input being connected to said output of said inverting means and said fourth comparator positive input being connected to said transducer means to receive said control signal, a first set-reset flip-flop, having a set input, a reset input and an output, means for connecting said output of said third comparator to said set input of said first set-reset flip-flop to set said first set-reset flip-flop when the magnitude of said control signal exceeds the magnitude of said voltage across said capacitor, a second set-reset flip-flop, having a set input, a reset input and an output, means for connecting said set input of said second set-reset flip-flop to said output of said fourth comparator to set said second set-reset flip-flop when the magnitude of said inverted voltage across said capacitor is greater than the magnitude of said control signal, a first photodiode connected to said output of said first set-reset flip-flop for producing a light output when said first set-reset flip-flop is set, a second photodiode connected to said output of second set-reset flip-flop for producing a light output when said second set-reset flip-flop is set, means for resetting both said first set-reset flip-flop and said second reset flip-flop in response to said pulse train appearing at the output of said ORing means a first triac for connecting said power line to said forward windings of said motor, first light responsive means for triggering said first triac in response to said light output from said first photodiode, a second triac for connecting said power line to said reverse windings of said motor, and second light responsive means responsive to said light output from said second photodiode for triggering said second triac.

9. A magnetic tape drive comprising:

a tape reel on which magnetic tape for said drive is wound, an A.C. motor for rotating said tape reel, said motor having a forward winding and a reverse winding, an idler roller for forming a tape buffer loop in said tape, a spring arm connected to said idler roller for applying a pre-determined tension to said tape, transducer means for developing a control signal proportional to the angular displacement of said spring arm, means for receiving power from an A.C. power line having a sinusoidal voltage waveform thereon, and a servo circuit for selectively applying power from said A.C. power line to said motor, said servo circuit comprising means for generating a saw-tooth voltage waveform synchronized to the frequency of said power line and having a frequency which is a multiple of the frequency of said power line, comparing means having an output and being responsive to said control signal and said voltage waveform, for applying a gate signal to said output when the magnitude of said voltage waveform equals the magnitude of said control signal and for removing said gate signal from said output the next subsequent time when the magnitude of said voltage waveform equals the magnitude of said control signal, and means responsive to said gate signal appearing at said comparing means output for applying power from said A.C. power line to said motor.

10. A magnetic tape drive according to claim 9 wherein said generating means in said servo circuit further comprises,
 detector means responsive to said A.C. power line for producing a pulse each time the magnitude of said voltage waveform of said A.C. power line substantially equals zero,
 integrator means for producing a linearly increasing voltage output, and
 means responsive to each said pulse for resetting said integrator means to a zero output.

* * * * *